Dec. 17, 1940.   C. E. KRAUS   2,225,400
METHOD OF AND MACHINE FOR MILLING
Filed June 11, 1938   8 Sheets-Sheet 1

INVENTOR
Charles E. Kraus
By Parker, Carlson, Pitzner & Hubbard
ATTORNEYS

Dec. 17, 1940.  C. E. KRAUS  2,225,400
METHOD OF AND MACHINE FOR MILLING
Filed June 11, 1938  8 Sheets-Sheet 2

INVENTOR
Charles E. Kraus
By Parker, Carlson, Pitzner + Hubbard
ATTORNEYS Patented Dec. 17, 1940

2,225,400

UNITED STATES PATENT OFFICE 2,225,400

METHOD OF AND MACHINE FOR MILLING

Charles E. Kraus, Rockford, Ill., assignor to The Ingersoll Milling Machine Company, Rockford, Ill., a corporation of Illinois Application June 11, 1938, Serial No. 213,163

31 Claims. (Cl. 90—18)

This invention relates to the removal of material, particularly metal, from a work piece through the use of a multiple blade rotary cutter by taking cuts extending between the rough and finished work surfaces generally longitudinally of the direction of relative feed between the cutter and the work.

The general object is to provide a novel method and machine by which the rate of material removal by a cutting action of the above general character may be increased many times as compared to ordinary milling practice and substantially increased over other methods of milling heretofore proposed.

In carrying out this object, the invention contemplates a novel relation between the movements of the cutting edges and the work such as to increase substantially the length of the chip removed by each edge and thereby enable a substantially greater volume of material to be removed by each edge without exceeding the permissible chip thickness or otherwise burdening the cutting material.

The invention also resides in the novel character of the method and machine which enables cuts of widely varying depths to be taken and variably contoured surfaces to be formed.

Another object is to provide a novel method of and machine for scarfing work pieces preparatory to welding to another work piece.

A further object is to provide a novel method of and machine for milling slots or channels in a work piece.

Other objects and advantages of the invention will become apparent from the following detailed description taken in connection with the accompanying drawings, in which

Fig. 21ª is a fragmentary sectional view taken along the line 21ª—21ª of Fig. 21.

While the invention is susceptible of various modifications and alternative uses and is capable of being practiced in a variety of machines, I have illustrated in the drawings and will herein describe the preferred embodiments of the invention and typical machines and ways for practicing the same. I do not intend, however, to limit the invention by such exemplary disclosure but aim to cover all modifications and alternative methods and constructions falling within the spirit and scope of the invention as expressed in the appended claims.

The improved method is illustrated somewhat diagrammatically in Figs. 1 to 4. Generally stated, it comprises revolving a cutter head 1 carrying a series of angularly spaced radially extending cutting edges 2 which define an annular end cutting face, and relatively feeding the revolving edges and a work piece $w$ along a path disposed relative to said cutting face at an angle $a$ included between the cutting face and the rough surface 10 and of such small magnitude that the projection of the cutting face on a plane 4 extending transversely of the direction of feed defines an elongated ellipse 5. With the work positioned to intersect the ellipse during the feeding movement, each cutting edge will engage the work over a long arc of the ellipse, that is, while traversing in opposite directions around one end portion of the ellipse and remove a slice of metal 6 the thickness of which is only a very small part of the feeding movement $c$ per tooth. However, each chip is extremely long, extending from a point of entry 7 on the finished work surface 8 along the latter past the central plane 4 or the cutter axis to a point of emergence 9 on the rough work surface 10. These characteristics combine to enable a large volume of metal to be removed per tooth and permit a feed rate many times as great as is ordinarily used in practice, and this, without over-burdening the cutting material.

Figure 1:
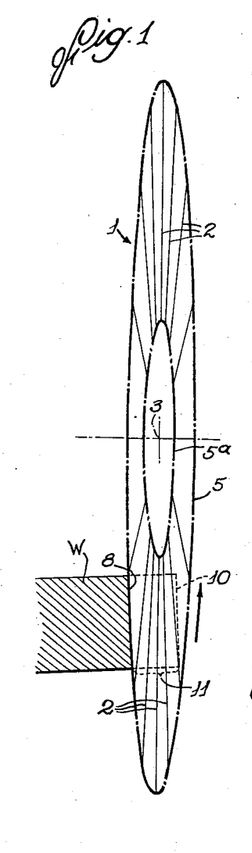
Figure 1 is a diagrammatic view looking in the direction of cutting during rough milling a generally flat surface in accordance with the present invention.

By virtue of the characteristic cutting action obtained, the successive cutting edges 2 coact to generate along the work piece a finished surface having a cross-sectional contour complemental at least in part to an arc of the ellipse 5. Thus, if the work piece is positioned as shown in Fig. 1 for initial engagement by the cutting edges along a substantially straight portion of the ellipse 5, a layer of metal 11 will be removed and a generally flat surface will be formed. As thus used, the improved process is especially adapted for rough milling work surfaces at high speed.

Figure 2:
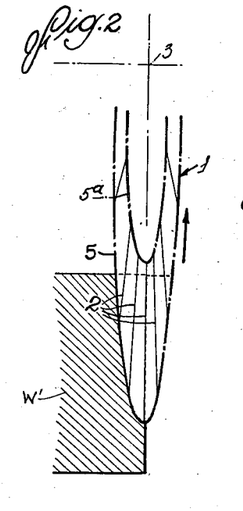
Figs. 2 and 3 are similar fragmentary views illustrating other adaptations.
Figure 3:
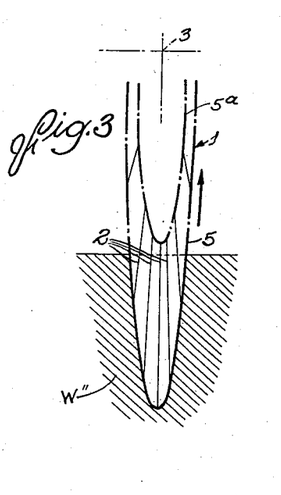

When the work piece is positioned for engagement with the cutting edges clear to the end of the ellipse 5, a final surface which is curved and complemental in shape to the end portion of the ellipse will be generated. Thus, with the work positioned relative to the ellipse as shown in Fig. 2, a transversely curved surface will be generated, being substantially straight along one side and quite sharply curved along the other side. A contour of this general shape may be utilized to advantage in scarfing the edges of plates preparatory to welding. Or, when the work piece is wider than the end of the ellipse as illustrated in Fig. 3, a slot corresponding in shape to the end of the ellipse may be formed.

Figure 20:
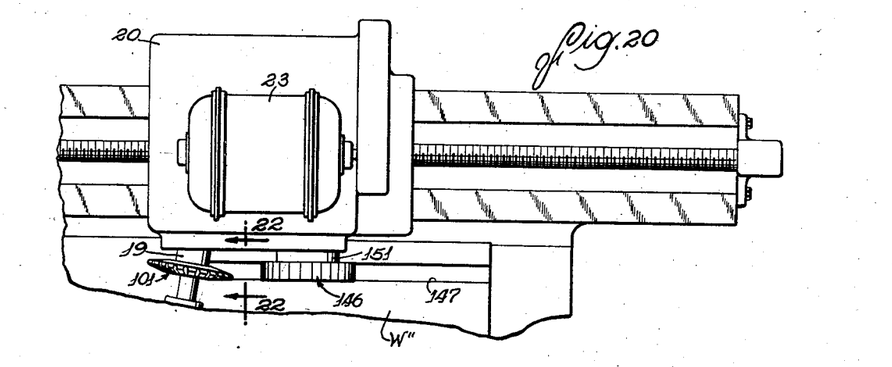
Fig. 20 is a fragmentary plan view of a milling machine adapted for milling slots in accordance with the present invention.
Figures 21, 21A:
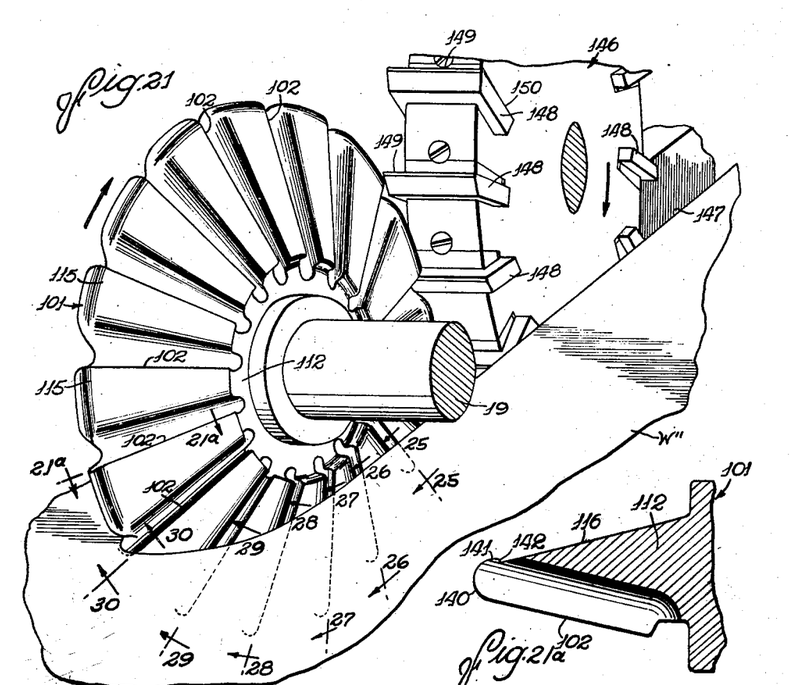
Fig. 21 is a fragmentary perspective view of the work piece and the cutters shown in Fig. 20.
Figures 22, 23, 24:
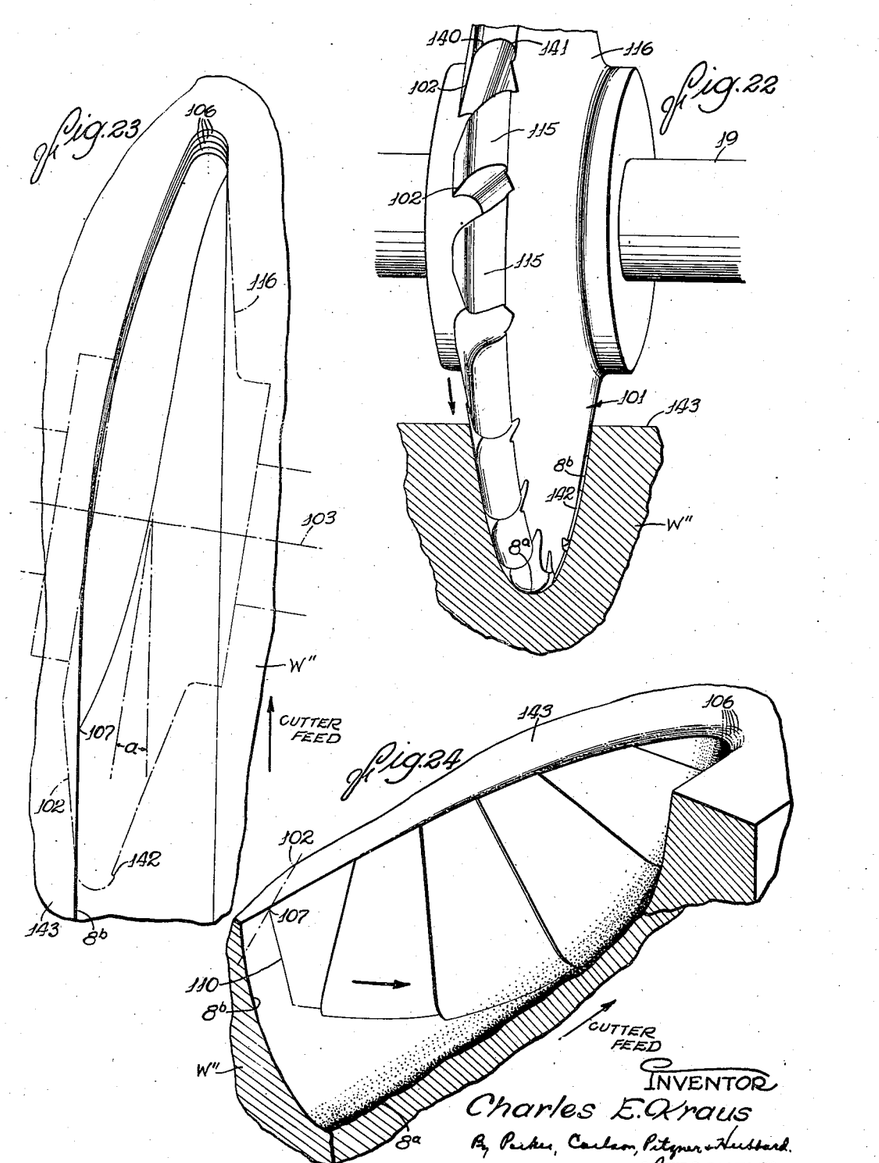
Fig. 22 is a fragmentary sectional view taken along the line 22—22 of Fig. 20.
Fig. 23 is a fragmentary plan view of the work being milled by the cutter shown in Fig. 22.
Fig. 24 is a fragmentary perspective view of a portion of Fig. 23 illustrating the manner of chip formation.

As will appear later, various modifications may be made in adapting the above general process to the removal of metal layers of different thickness, to the formation of various surface contours, and to provide proper support for the cutting edges under various conditions while at the same time utilizing the characteristic cutting action described above to increase the rate of metal removal. For example, the shape of the outer end portions of the cutting edges may be extended and curved or beveled (see Figs. 12 and 13) and the cutting face defined by the edges 2 may be slightly coned as illustrated in Figs. 20 and 23.

Figures 5, 6, 7:
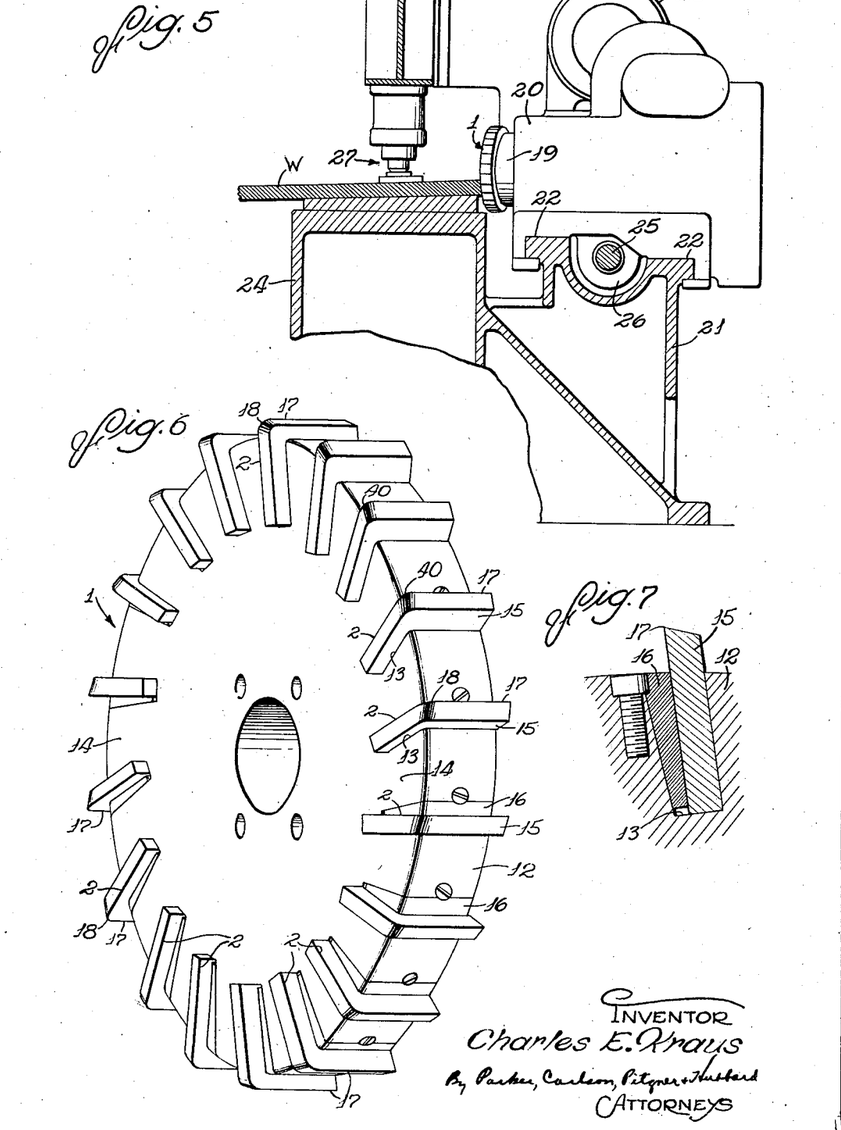
Fig. 5 is a fragmentary cross-sectional view of a typical form of milling machine in which the invention may be practiced.
Fig. 6 is a perspective view of one form of cutter.
Fig. 7 is a fragmentary transverse section through one of the cutter blades and its mounting.

Also, the particular angle $a$ at which the cutting face is skewed away from the rough work surface or the line of feed will be influenced by various factors including the size of the cutter, the thickness of stock to be removed from the work, the contour to be formed, the feed rate desired, etc. Since the length of the chips and therefore the rate of metal removal which is permissible without overburdening the cutting material increases as the skew angle $a$ is decreased and the minor axis of the ellipse 5 is shortened, it is desirable, from the standpoint of increasing the permissible feed rate, that the angle $a$ be small. Skew angles of a few degrees have been found satisfactory, and ordinarily it is desirable that the angle be five degrees or less although somewhat greater angles may be employed with an attendant decrease in permissible feed rate.

Where possible, it is desirable to employ a cutter of the inserted blade type. As shown in Figs. 5, 6, and 7, the cutter 1 comprises a short cylindrical body 12 having blade slots 13 angularly spaced around one end face 14 and extending substantially radially. Blades 15 are locked in the body in any suitable way as by wedges 16 or the like, one side and one end of the blade projecting from the body. Formed along the projecting portions of the blades are the main cutting edges 2, a peripheral edge 17 and a connecting or corner edge 18 which may, for purposes to appear later, be rounded as shown. For the surfacing operations illustrated in Figs. 1 and 2, the main edges 2 are preferably disposed in a common plane. Considering the characteristic cutting action obtained, it will be apparent that the radial length of the main edges 2 will be determined by the width and shape of the work surface to be milled. Also, the diameter of the cutter will be influenced mainly by the width of the work and by the maximum feed rate desired.

The cutter is carried by a spindle 19 projecting at the proper angle from a carriage 20 mounted on a bed 21 to slide along horizontal ways 22 which define the direction of feed and provide for relative rectilinear movement between the rotating cutter and the work piece. The spindle may be driven through appropriate transmission mechanism from an electric motor 23. In the typical milling machine illustrated, the work, while being machined, is supported upon a stationary pedestal 24 rigid with the machine bed. Feeding of the tool carriage along the work may be accomplished by a separate motor driven mechanism (not shown) operating to drive a screw 25 threading into a nut 26 on the carriage. If desired, the work may be held firmly on its support by suitable power actuated clamps 27.

The machine thus described is typical of those which may be employed to support the cutter and the work in the desired relation and produce the proper relative feeding motions.

To locate the cutting face at the proper angle $a$, the cutter axis 3 is tilted longitudinally of the direction of feed and toward the finished work surface 8 at an equal angle $d$ relative to the plane 4. Such positioning is obtained by properly locating the spindle 19 the mounting of which may, if desired, be adjustable to provide different skew angles $a$.

Figure 4:
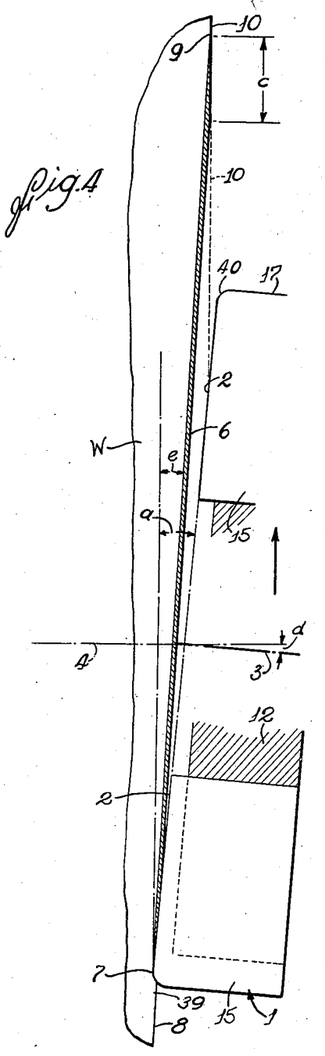
Fig. 4 is a fragmentary plan view of the work and cutter, a chip removed by one cutter blade being shown in section.
Figures 8, 9, 10, 11, 12, 13:
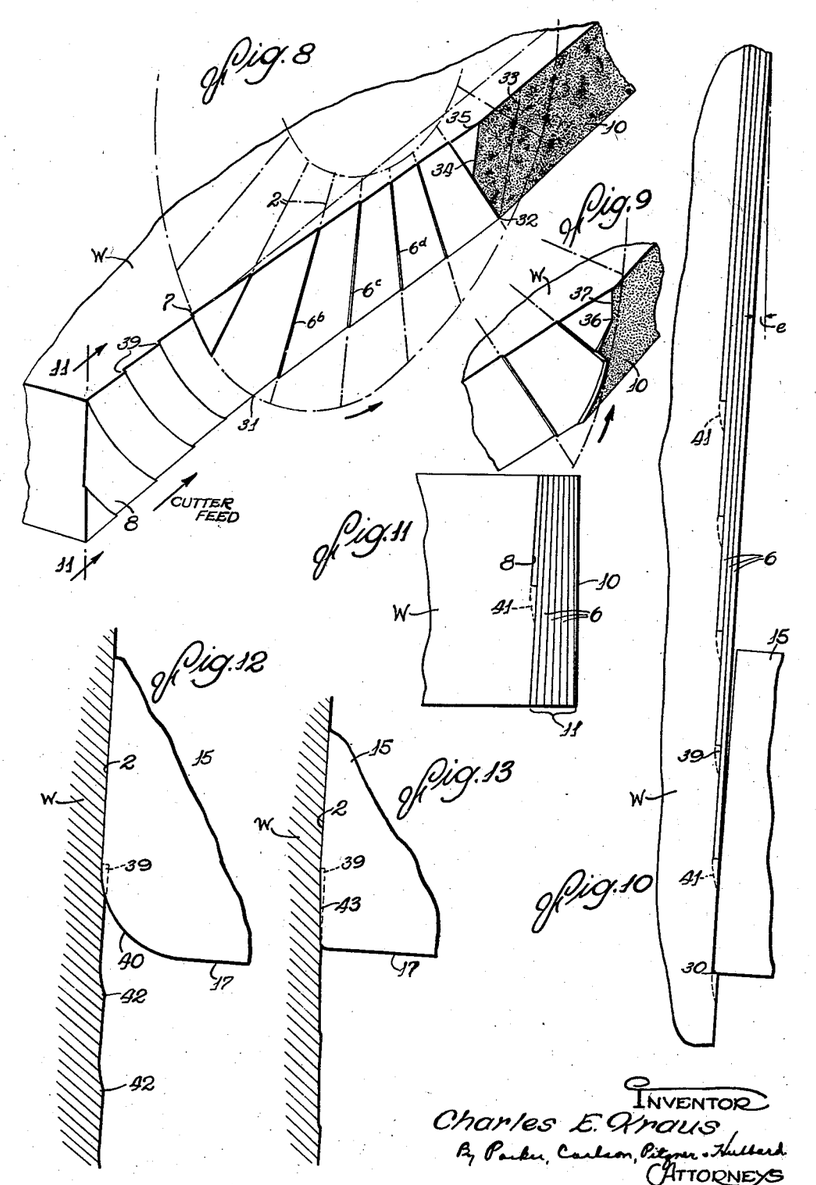
Fig. 8 is a fragmentary perspective view of a work piece in the course of the milling operation.
Fig. 9 is a similar view illustrating a modified relation of the work piece and cutting edges.
Fig. 10 is a fragmentary plan view of a work piece illustrating the lines along which metal slices are removed during milling of the piece.
Fig. 11 is an end view of the work piece showing the lines along which the metal slices are removed and looking in the direction indicated by the line 11—11 in Fig. 8.
Fig. 12 is an enlarged fragmentary plan section of the work piece and one cutter blade.
Fig. 13 is a similar view showing a modified form of blade.

The action of the cutting edges in rough milling a relatively narrow work piece W to form a substantially flat surface 8 thereon will now be considered, reference being made to Figs. 1, 4, and 5 to 13. To simplify the explanation, let it first be assumed that the cutter blades 15 are shaped as shown in Fig. 10 with the side and end portions 2 and 17 of each blade edge intersecting each other at relatively sharp corners 30. The radial lengths of the edges 2 defining the end face of the cutter are, of course, substantially greater than the width of the work. The latter is mounted as shown in Figs. 1 and 4 with the rough surface 10 disposed at the desired skew angle $a$ relative to the cutting face and with the metal layer 11 to be removed intersecting the ellipse 5 near but outwardly beyond the ellipse 5ª defined by the inner ends of the blade edges. Also, the skew angle preferably employed would be such that the plane of the rough work surface 10 projects substantially beyond the major axis of the ellipse 5 as shown in Fig. 1 but with the metal layer 11 falling wholly within the ellipse.

As the cutter carriage is fed and the cutter is rotated in the directions indicated, the edge portion of the work piece is relatively fed against the inclined end face of the cutter and through the path traversed by each cutting edge 2 in moving both downwardly and upwardly around the lower segmental portions of its circular path, thereby cutting across the work in opposite directions. In moving downwardly, the outer end or corner 30 of each edge enters the work at the point 7, the zone of engagement between the edge and the work increasing from the corner point and progressing inwardly along the edge 2 as indicated by the length of the chip section 6ª in Fig. 8. After the outer end of the edge passes the lower surface of the work at the point 31, the zone of engagement decreases in length as indicated by the lengths of the chip sections 6ᵇ and 6ᶜ until the chip section is disposed vertically as shown at 6ᵈ. Thereafter, the zone of engagement lengthens until the edge in moving upwardly emerges from the rough surface 10 on the lower side thereof at a point 32 disposed intermediate the ends of the cutting edge 2. As the emerging edge continues upwardly, it leaves the rough work surface along the dotted line 33, the point of emergence shifting inwardly along the blade edge 2. The line of emergence of the preceding blade edges is indicated at 34. Such emergence of the blade edge along the rough surface 10 is due to the fact that the layer 11 is disposed wholly within the ellipse 5. The inclination of the line 33 of emergence will vary with the rate of feed, the size of the cutter face, and the skew angle employed, and its location longitudinally of the work will vary with the thickness of the stock 11 being removed from the work.

Each cutting edge thus removes from the work a slice 6 of metal which extends from the single point 7 of entry on the finished work surface and at the upper side thereof to the point 35 of final disengagement on the rough work surface. Throughout its length the chip is disposed at a constant angle $e$ relative to the direction of feed. The length of the metal slice is controlled by several factors including the magnitude of the skew angle $a$, the rate of feed, the diameter of the cutter, and the distance the work is offset from the cutter axis. In any case, the points of entry and emergence are disposed on opposite sides of the cutter axis and the plane 4 so that each edge engages the work in moving downwardly and toward the center of the cutter as well as beyond the center and upwardly. Accordingly, the zone of engagement extends over a length of the work which may be substantially greater than the diameter of the cutter as shown in Fig. 4. Also, the chip is substantially constant in thickness in directions both transversely (Fig. 11) and longitudinally (Figs. 4 and 10) of the work. These characteristics of the present process enable a large volume of metal to be removed by each blade edge.

It will be observed from Figs. 4 and 10 that the last formed end portion of each chip tapers to a feather edge. This is due to the fact that the edges 2 emerge from the rough surface along lines 33 instead of the top surface. As a result, the end edges 17 of the blades are disposed externally of the work and are not active while the blades are moving upwardly through the work. This is an advantage in avoiding possible thickening of the last formed portion of the chip when high feed rates are employed.

Of course, the length of the chip might be increased somewhat by an arrangement in which the blade edge would emerge from the rough work surface at a point 36 (Fig. 9) spaced somewhat above the lower side of the work and continuing along a line 37. Such a relation might obtain when a smaller skew angle $a$ is employed or a thicker layer 11 of metal is removed. However, the point 36 of emergence should not be raised to such a degree as to increase the thickness of the last formed end portion of the chip beyond the permissible maximum.

The angle $e$ at which each chip is inclined relative to the direction of feed is dependent on the rate of feed. However, because this angle is extremely small and substantially less than the skew angle $a$, chip thickness is only a very small proportion of the feed movement $c$ per cutter blade. Accordingly, the feed rate may be increased with the present process to a value many times greater than that which is feasible in ordinary milling practice without exceeding the maximum permissible chip thickness as determined by the kind of cutting material of which the blade edges are composed. For example, with a skew angle of two degrees, a cutter twelve inches in diameter equipped with high speed steel blades and operating on ordinary cast iron may, when rotated to give the proper cutting speed, be fed at a rate of 500 inches per minute when cutting a layer of metal one-fourth inch thick.

Owing to the spacing of the blade edges and the inclination of the metal slices 6 relative to the direction of feed, the exact contour of the finished surface will be controlled by the shape of the outer ends or corners of the cutting edges. When, as above assumed, these corners are substantially square, shallow curved ribs 39 will be left on the machined work surface as shown in Fig. 10 and indicated in dotted outline in Figs. 12 and 13. These extend transversely of the work along the paths traversed by the outer ends of the successive blade edges 2 and the adjacent portions of the end edges 17. Except, however, for these shallow ribs, the height of which has been exaggerated for purposes of illustration, the finished work surface is substantially flat. As previously explained, this is because its contour corresponds to the side of the extremely shallow ellipse 5.

For some roughing operations such as removing scale or forming an approximately straight edge preparatory to welding, the presence of the ribs 39 is not objectionable. Other applications require a smoother surface. This may be obtained by employing a cutter having blades formed with edge extensions disposed beyond the outer ends of the edges 2 and gradually curved away from the plane of the edges 2 as indicated at 40 (Figs. 4, 6, and 12). In the operation of the preferred form of cutter, that portion of each rounded edge portion 40 adjacent the outer ends of the edge 2 will traverse the work along a path 41 indicated by the dotted lines in Figs. 10 and 11 thereby removing the major portion of the rib 39 which would otherwise be formed. As a result, the ridges 42 which are left are so shallow that the final work surface possesses a smoothness comparable to that obtained in ordinary rough milling operations and is sufficiently accurate for most roughing purposes.

Greater smoothness of the final surface may also be obtained by slightly beveling the outer end portions of the blades to form substantially straight edge portions 43 (Fig. 13) extending outwardly beyond the edges 2. These extensions act in the same manner as the curved extensions 40 in removing the ribs 39 which would be formed by the action of the edge portions 2 alone.

Figure 14:
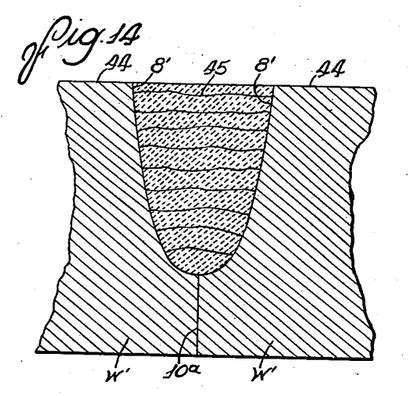
Fig. 14 is a fragmentary cross-sectional view through a welded joint connecting two work pieces after scarfing thereof in accordance with the present invention.

Considering now other adaptations, the improved cutting process lends itself readily to the so-called scarfing of metal plates preparatory to welding of adjacent plates together in edge-to-edge relation. This involves the formation of a surface 8' having a wide and generally flat side portion intersecting one side 44 of the work plate W' and a narrower relatively sharply curved portion intersecting the rough edge 10ª of the plate. When two plates thus scarfed are arranged in edgewise abutment, the surfaces 8' define a groove into which metal 45 (Fig. 14) may be flowed to weld the plates together.

Plates may be scarfed to the general contour above described by employing a cutter having square nosed blades as shown in Fig. 10 and by arranging the work for operation of the cutter over an arc of the ellipse 5 terminating on the major axis as illustrated in Fig. 2. It is preferred, however, to widen the curved portion of the surface 8' and curve the same more gradually so as to form a substantially wider groove for receiving the welding metal. The invention contemplates doing this by employing the straight portions 2 of the blade edges to form the generally flat part of the scarfed surface and providing arcuate extensions to impart the desired curvature to the remainder of the surface.

The cutter blades thus modified are shaped as previously described and shown in Figs. 4, 6, and 12, each having a straight radially extending portion 2, an end portion 17 parallel to the cutter axis, and an intervening connecting or corner portion 40 of arcuate shape. The curvature of the latter will, of course, vary with the desired shape of the final surface 8', a true arc having a comparatively small radius of curvature ordinarily being employed.

Except for the position in which the work is maintained, the operation of scarfing a plate W' is the same as the roughing operation previously described. The cutter is set at the proper skew angle a and rotated and fed in the directions indicated in Fig. 18. The edgewise position of the work plate relative to the cutter is such that ellipse 5 described by the straight edge portions 2 intersects the work at the proper depth along the upper side 44. The vertical location of the plate is such that the lowermost active portion of the cutting edges is spaced above the lower plate surface a distance determined by the width of the edge surface 10ª to be left on the work.

The cutting action which occurs with the work plate thus positioned is generally similar to that previously described and is illustrated more in detail in Figs. 15 to 19. Each blade edge in moving downwardly enters the work at a point 7' of intersection between the finished work surface 8' and the upper side surface 44, the initial engagement being along the edge portion 2 and a short adjacent part of the curved edge 40 (see Fig. 16). When the cutting edge has progressed downward to the first blade position indicated in Figs. 17 and 18, the cross-section of the chip tapers from the upper work surface to a point 46 of mergence with the surface formed by the previous blade. Thereafter, the zone of engagement with the blade progresses outwardly along the curved edge 40 so that the tapered end of the chip section becomes curved as shown at 47, the major portion of the chip being of substantially uniform transverse thickness. This tapering to a feather edge along the lower side of the chip continues and the curvature becomes more pronounced until the blade reaches a vertical position shown in full lines in Fig. 17. At this time, the zone of engagement between the blade edge and the work is of maximum length extending substantially the full length of the edge portion 2 and around the curved portion 40 to a point 48 which intersects the plane of the rough work surface and defines the lowermost edge of the final surface 8'. The point 48 may, of course, fall on the end edge 17 depending on the exact position of the rough work surface 10.

Figure 15:
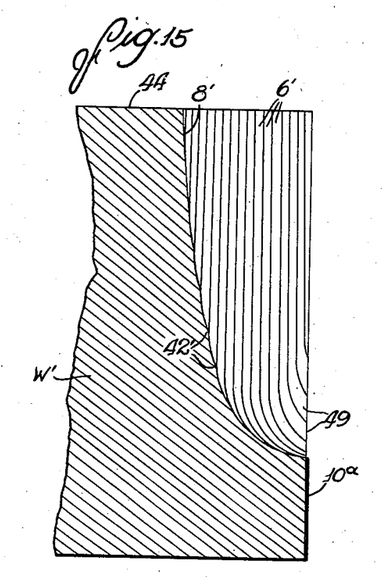
Fig. 15 is a fragmentary cross-sectional view of a work piece illustrating the manner of removing a metal slice to scarf the piece preparatory to welding.
Figures 17, 18, 19:
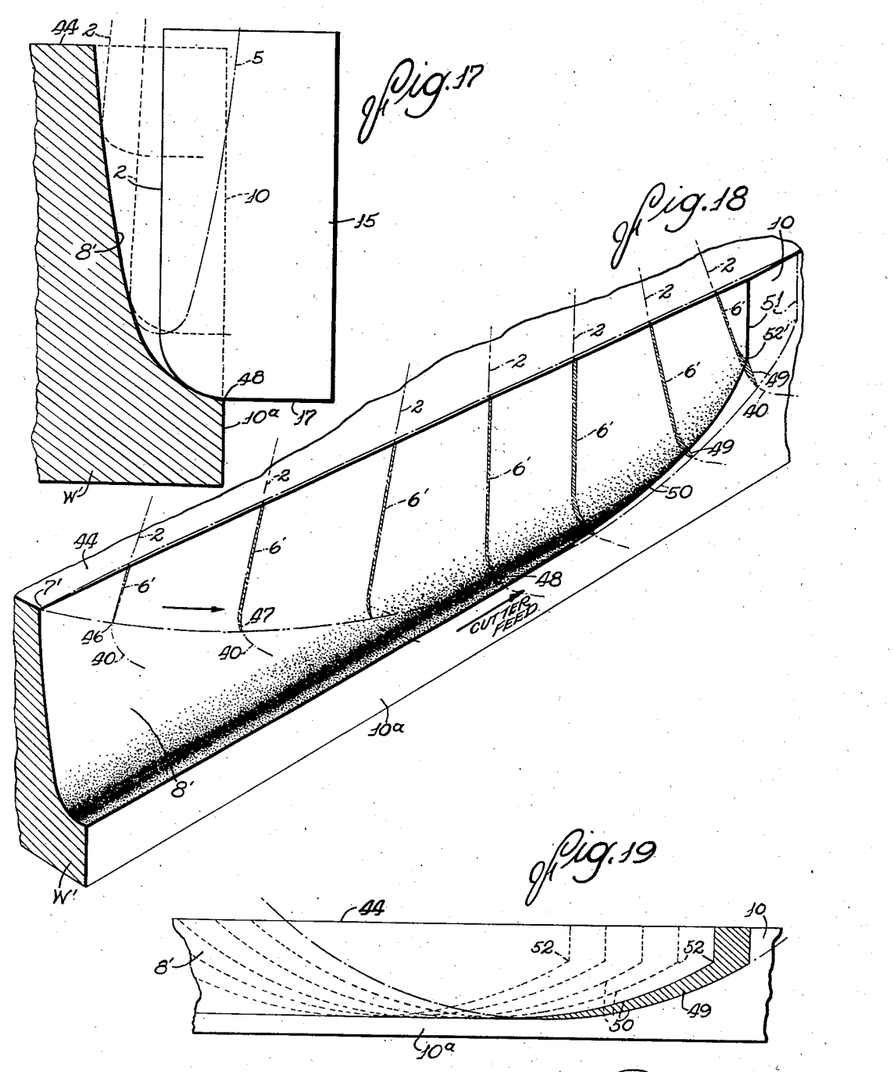
Fig. 17 is a transverse sectional view showing a work piece and cutter blade in the course of a scarfing operation.
Fig. 18 is a fragmentary perspective view of a work piece illustrating the manner of chip formation during a scarfing operation.
Fig. 19 is a fragmentary side elevational view of the work piece shown in Fig. 18.

In the continued movement beyond the center of the cutter, the blade begins to move upwardly, the zone of engagement with the work shifting not only outwardly along the edge portion 2 but also inwardly along the curved edge 40. The chip thus begins to decrease in width and also acquires thickness at its lower edge as indicated at 49. This is due to the fact that the point of intersection with the rough work surface progresses along a line 50 which is disposed below the corresponding line of emergence of the previous blade. Accordingly, the width of the chip edge increases as shown in Figs. 15 and 18 and in full lines in Fig. 19 until finally the blade edge 2 emerges from the rough work surface along a line 51 when the point of intersection between the curved blade edge 40 and the work surface has risen to 52. The inclination of the line 51 will vary with the feed rate being employed.

Figure 16:
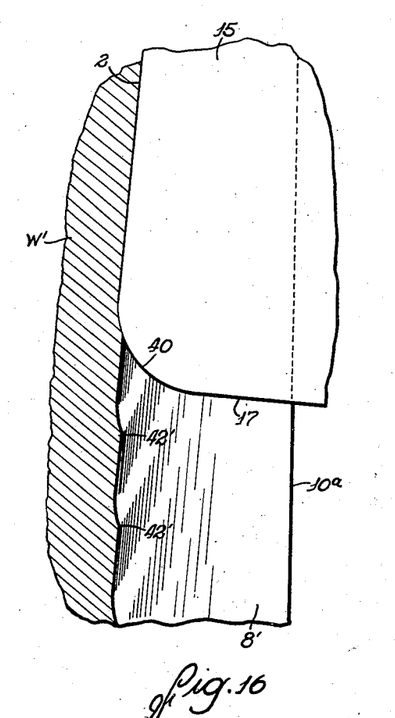
Fig. 16 is a fragmentary plan section of a work piece and one cutter blade during scarfing of the former.

As a result of the cutting action above described, metal is removed from each longitudinal section of the work in successive slices 6' and along cutting lines part of which are shown in Fig. 15. The upper parts of the slices are formed by the straight edge portions 2 of the cutter and are shaped the same as the chips removed in the roughing milling operation previously described. These chip portions are generally uniform in thickness and extend from the point of blade entry on the finished work surface 8' to the line 51 of emergence on the rough surface. The lower parts of the chips are cut by the curved edge portions 40 which not only control the width and shape of the chip but also the smoothness of the finished surface. Thus, the curved edges act in the manner previously described to cut off the transverse ridges which would otherwise be left by the straight edges 2 during the downward movement of each edge portion 40 while the final contour of the work is being determined. Such edge portion curves gradually away from the surface cut by the preceding blade thereby tapering the chip to a feather edge and leaving only shallow ridges 42' which are shown in Figs. 15 and 16 on an exaggerated scale. The edge portions 40 also remove the metal below and outwardly beyond the ellipse 5, this being effected in a manner such as to impart the desired contour to the more sharply curved portion of the final surface.

It will be observed that during the upward movement of the blades after passing the cutter center, the thickness of the chip at and adjacent its curved end increases progressively. The amount of this increase is determined by the rate of feed employed and also by the height to which the blade edge rises before emerging from the work along the line 51. Thus, the thickness of the chip at its curved edge may increase beyond the thickness at the straight edge and even beyond the maximum permissible thickness as determined by the cutting material employed. To this extent, the action of the portions 40 and 17 of the cutting edges reduces the permissible rate of feed during the scarfing of grooves of the above character. In order to minimize this reduction in permissible feed rate, it is desirable to so shape the blade edges and position the work relative to the cutter that the points 52 at which the cutting edges emerge from the work are sufficiently low to avoid objectionable thickening of the chips when the desired feed rate is used.

Preparatory to welding of plates together in the manner previously referred to, it is, of course, necessary to machine the remaining edge surface 10ª. Preferably this is effected simultaneously with the milling of the surface 8'. To this end, an additional power driven cutter (not shown) may be mounted on the carriage 20 and arranged to follow up the scarfing cutter and rough mill the surface 10ª in the manner previously described and illustrated in Figs. 1, 4, 10, 11, and 12. Both cutters would thus be adapted for operation at high rates of feed. The surface 10ª may, of course, be machined in a separate operation or by any other preferred method.

As illustrated somewhat diagrammatically in Fig. 3, the present invention may also be utilized to increase the rate at which a slot or groove may be milled in a work piece. In order, however, to provide proper support for the cutting edges, it is necessary to modify the construction of the cutter in several particulars. Referring to Figs. 20 to 35, the cutter 101 preferably employed comprises a body 112 fast on the spindle 19 of the tool carriage 20 and having teeth 115 formed integral therewith. Formed along the leading sides of the teeth are main cutting edges 102 which, instead of being disposed in a common plane as in the cutters previously described, lie on a shallow conical frustum. The back face 116 of the body is similarly coned. Thus, the cutter body possesses thickness and provides the necessary support for the cutting edges. The necessity for coning the cutter face and the amount of such coning which is required will depend upon various factors including the width and cross-sectional shape of the groove to be formed, the blade strength required, the magnitude of the skew angle $a$, and the feed rate desired.

In addition to the straight or main edges 102, the blades are formed with curved edges having one portion 140 (Fig. 21ª) merging with the outer ends of the edges 102 the same as in the blades previously described and another portion 141 extending beyond the median plane of the cutter body and reversely along the back side thereof to a shoulder 142. The two portions 140 and 141 thus define a peripheral cutter edge generally semi-circular in shape and having a radius of curvature determined largely by the bottom contour of the groove to be formed.

The groove formed in operation of the cutter 101 above described corresponds in general shape to one end of an ellipse and is defined by a surface having a relatively sharply curved bottom 8ª and more gradually curved side walls 8ᵇ intersecting the upper side 143 of the work W'' substantially at right angles.

In the use of the cutter 101, its axis 103 is inclined relative to the work so as to define the desired skew angle $a$ between the plane of rotation of the cutter and the direction of feed. The work is positioned as shown in Figs. 22 and 23 so that the cutter traverses a path intermediate the edges of the work and the lower segmental part of the cutter intersects the work to determine the depth of the groove to be formed.

During rotation and feeding of the cutter in the directions indicated by the arrows (Figs. 22, 23, and 24), each edge 102 in moving downwardly enters the work at a point 107 of intersection between the adjacent side 8ᵇ of the finished surface and the top surface 143. Because of the conical shape of the cutter face, the point 107 will be spaced inwardly from the outer end of the edge 102. As the blade edge advances downwardly, the zone of engagement shifts both inwardly and outwardly along the edge, the intersection with the work surface finished by the previous blade being along a line 110 (Fig. 24). During movement of the blade edge to vertical position, the chip being removed increases in width and changes in sectional shape as shown in Figs. 24 and 25 to 27. At first, the section is generally straight and tapers toward the lower edge at the point of intersection of the edge and the surface cut by the preceding blade. Thus, when the curved edge portion 140 becomes effective, the feather edge of the chip becomes curved (see Figs. 26 and 27).

Figures 28, 29, 30, 32:
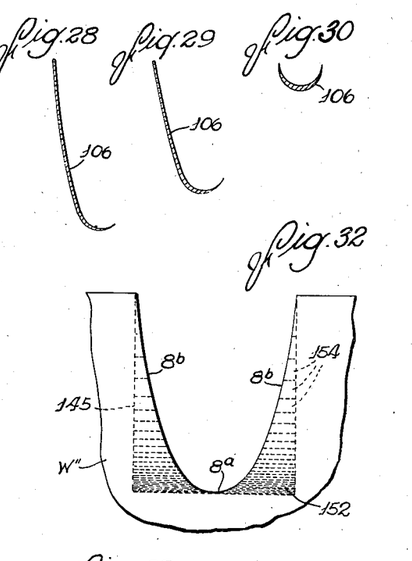
Fig. 32 is a fragmentary end view of a slotted work piece illustrating the manner of chip removal to form a slot of rectangular cross-section.
Figure 33:
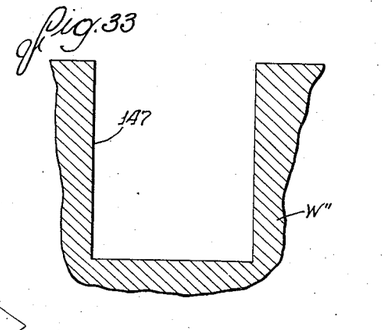
Fig. 33 is a transverse section of the work piece after formation of the completed slot.
Figures 34, 35:
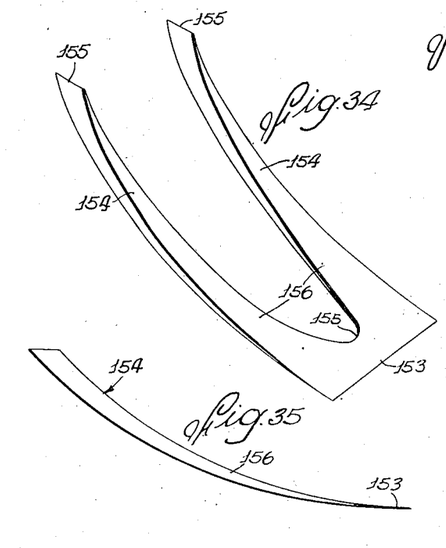
Fig. 34 is a perspective view of the chip formed by the second cutter shown in Fig. 20.
Fig. 35 is a side elevational view of the chip shown in Fig. 34.

In the movement of the blade beyond the vertical position (Fig. 27), the zone of engagement shifts outwardly around the periphery of the cutter and along the curved edge portion 141. The chip 106 thus becomes curved reversely at its lower end (Fig. 28) and assumes a thickness that increases progressively as the blade continues upwardly out of the work. At the same time, the long leg of the chip section decreases in length as the zone of engagement along the edge 102 moves outwardly. Finally, as the blade emerges from the work at the upper surface of the latter, only the curved portions 140 and 141 of the blade edge are effective, the chip sections being shaped as shown in Fig. 30.

Figures 25, 26, 27, 31:
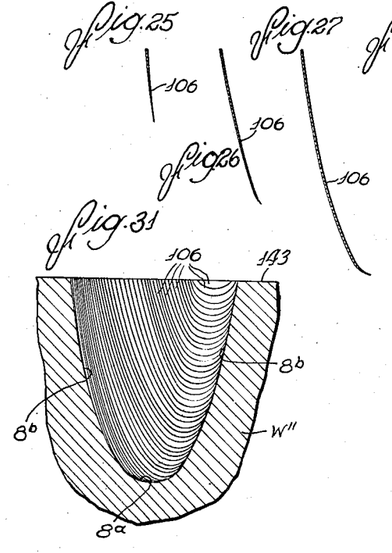
Figs. 25, 26, 27, 28, 29, and 30 are chip sections taken along the lines 25—25 to 30—30 of Fig. 21.
Fig. 31 is a fragmentary transverse section illustrating the manner in which metal slices are removed by the slotting cutters shown in Fig. 22.

From the foregoing, it will be seen that metal is removed to form each longitudinal section of the groove in the work in the form of a series of thin slices 106 shown in Fig. 31. Because the edge portions 102 are active from the point of entry substantially to the line of emergence and the major portion of the metal is removed by these edges, each chip will be of substantial length because these edges cut while moving downwardly into the work. Advantage is thus taken of this characteristic action previously described in increasing the volume of metal removed by each cutter blade and correspondingly increasing the permissible rate of feed.

As in the scarfing operation previously described, the contour of one side portion of the groove is determined by the edge portions 102 and the adjacent curved portions 140. The other side of the groove is shaped solely by the curved edge portions 141, the action of the latter being similar to that of the blades in an ordinary slab milling cutter. However, the curved edge portions 140 and 141 are of short effective lengths, and the chip section removed thereby thickens appreciably only during the final upward movement of the blade out of the work. Because of this, the cutting material is not overburdened to an objectionable degree even though the rate of feed employed is such as to produce a momentary chip thickness near the point of emergence greater than the thickness considered feasible with ordinary slab milling cutters. Therefore, while the permissible rate of feed is reduced substantially by the action of the curved blade portions 141 in defining one side of the slot in the work, this rate is nevertheless substantially higher than that obtainable with the milling cutters ordinarily used to form slots.

In addition to forming grooves of the general shape indicated, I have discovered that the characteristic cutting action obtainable with the present invention may be utilized to advantage in another way. The cutter 101 operating in the manner described may be employed to rough out an elliptically shaped groove (Fig. 32) and prepare it for finishing a desired shape 145 by the second cutter operating at a comparatively high rate of feed. For example, if a groove 147 of rectangular cross-section is to be formed, an ordinary channeling cutter 146 (see Figs. 20 and 21) would be mounted for feeding movement longitudinally of the groove formed by the cutter 101. The blades 148 of this cutter are formed with a side edge 149 and two end edges 150 the relation of which determines the shape of the finished groove. Preferably, the cutter 146 is fast on a spindle 151 journaled in the carriage 20 and driven by the motor 23 in the direction indicated.

During the advance of the carriage 20, the cutter 146 follows the cutter 101 and operates to remove the metal within the area 152 thereby forming a rectangular groove. Each blade 148 enters the work along the finished bottom of the groove and moves upwardly out of the groove taking a chip of the shape shown in Figs. 34 and 35. The thickness of the chip changes as the blade moves upwardly increasing progressively from a feather edge 153 adjacent the bottom of the channel. After the blade edge has emerged from the bottom 8ᵃ of the slot formed by the roughing cutter 101, the chip is divided into two legs 154 formed by the respective end edges 150 and short adjacent end portions of the side edge 149, the central part not engaging the work. Owing to the widening of the rough slot toward its open side, the chip legs 154 will decrease in lateral thickness progressively as the blade rises, tapering substantially to feather edges 155 as the blade leaves the work.

Such division of the chip into two legs and tapering of the latter results from the general elliptical shape of the slot roughed out by the cutter 101 and is utilized to advantage in increasing the rate which the channeling cutter may be fed through the work. Thus, although the thickness of the chip legs 154 in a vertical direction is proportional to the rate of feed, the same as in an ordinary slab milling operation, this dimension does not determine the effective thickness of the chip as the blade is leaving the work. On the contrary, the latter thickness is measured laterally of the legs 154 in which direction (see Fig. 32) the thickness does not, during a substantial portion of the final cutting movement, exceed the maximum permissible. It follows, therefore, that the rate of feed of the channeling cutter may be increased a value at which the vertical thickness in the wider portions 156 of the chip legs 154 approaches the maximum permitted by the cutting material being used. A rate of feed considerably higher than that permissible in forming channels with a single slab milling cutter is thus obtained by taking advantage of the related characteristics of the cutting actions of the cutters 101 and 146.

I claim as my invention:

1. The method of removing metal from a work piece which comprises causing a continuous feeding movement between the work and an annular series of radially extending cutting edges defining an end cutting face disposed at an angle of feed a few degrees to the direction of said feeding movement, and during said feeding movement revolving said edges through the work successively along arcuate paths each extending generally longitudinally of the work from points of edge entry and emergence disposed respectively on the finished and rough surfaces of the work and on opposite sides of the axis of revolution of the edges.

2. The method of removing metal from a work piece which comprises revolving an annular series of radially extending cutting edges defining an axially facing cutting face, and relatively feeding the rotating cutter and the work piece to advance the work piece through a segment of said cutting face and against the latter at a small included angle between the face and the rough work surface whereby to generate on the work a surface having a transverse sectional shape constituting the arc of an ellipse.

3. The method of removing metal from a work piece which comprises rotating a cutter carrying a series of elongated cutting edges defining an end cutting face of substantial radial width, and relatively feeding the rotating cutter and the work piece to advance the work piece into said cutting face at an angle such that the projection of the cutting face on a plane perpendicular to the direction of feed defines an ellipse with its center offset from the path of relative feed whereby the work piece is engaged by said edges over a predetermined arc of the ellipse.

4. The method of removing metal from a work piece which comprises rotating a cutter carrying a series of elongated cutting edges defining an end cutting face of substantial radial width, mounting a work piece and said cutter for relative feeding movement along a rectilinear path disposed relative to said cutting face at an angle of a few degrees whereby the projection of the cutting face on a plane perpendicular to said path defines a shallow ellipse having its center offset from the path in the direction of the major axis of the ellipse, and relatively feeding the work piece along said path toward said end face and into engagement therewith over a selected sector of said ellipse.

5. The method of surface milling a work piece which comprises causing a continuous feeding movement between the work and a revolving series of cutting edges along the final surface to be formed, and during such movement taking successive cuts each extending across said work piece first in one direction and then in the opposite direction while progressing longitudinally of the direction of feeding movement at an angle of a few degrees relative thereto from the final work surface to the rough work surface whereby to remove thin slices of metal.

6. The method of removing metal from a work piece which comprises causing a continuous feeding movement between the work and an annular series of radially extending cutting edges revolvable about an axis tilted in the direction of feed a few degrees away from the unfinished part of the work and from a perpendicular to the direction of said feeding movement, and during such feeding movement revolving said edges successively through a zone of the work offset from said axis.

7. The method of removing metal from a work piece which comprises rotating a cutter carrying a series of elongated cutting edges defining an end cutting face of substantially greater radial width than the work surface to be milled, relatively feeding the rotating cutter and the work piece along a rectilinear path disposed at an angle relative to said face such that the projection thereof on a plane perpendicular to the direction of feed defines a shallow ellipse with the rough work surface disposed at a small included angle relative to the end cutting face, and during such feeding movement, maintaining the work piece positioned for intersection with said end cutting face over an area of said ellipse spaced from one end thereof whereby said edges generate on the work a generally flat surface complemental in shape to one side of the ellipse.

8. The method of surface milling a work piece which comprises causing a continuous feeding movement between the work and an annular series of cutting edges along the final surface to be formed, and during such movement revolving said edges successively through the work between points of entry and emergence disposed along the path of feed on opposite sides of the axis of revolution of the edges to remove metal in thin slices each increasing in width beyond said point of entry and then decreasing in width as the active edge approaches said axis.

9. The method of surface milling a work piece which comprises causing a continuous feeding movement between the work and a revolving series of cutting edges along the final surface to be formed, and during such movement taking successive cuts longitudinally of and at a small angle to the direction of feeding movement and each progressing from a single point of engagement on the finished work surface to emergence on the rough work surface so as to remove metal in a thin slice increasing in width at one end from said point of entry and decreasing in width toward the other rod.

10. The method of surface milling a work piece which comprises causing a continuous feeding movement between the work and a revolving series of cutting edges along the final surface to be formed, and during such movement taking successive cuts longitudinally of and at a small angle to the direction of feeding movement and each progressing from a single point of engagement on the finished work surface to emergence on the rough work surface so as to remove metal in a thin slice increasing in width at one end from said point of entry disposed on one side of the axis of revolution of said edges and decreasing in width within a zone of engagement beyond such axis.

11. The method of surface milling a work piece which comprises causing a continuous feeding movement between the work and a revolving series of cutting edges along the final surface to be formed, and during such movement cutting first in one transverse direction and then in the opposite direction across said work piece along parallel lines each progressing longitudinally of the direction of feeding movement at a constant angle of a few degrees relative to the direction of feed to remove successive slices of metal having uniform thickness substantially throughout their lengths.

12. The method of scarfing a metal plate which comprises revolving an annular series of cutting edges defining an end cutting face having a flat central portion and an outer peripheral portion curved outwardly and away from the flat portion, relatively feeding the plate and said edges longitudinally of one edge of the plate and at a small angle to said face, and during such feeding movement maintaining said plate positioned for entry of each edge on one side surface of the plate and for emergence of the edge from the edge surface of the plate.

13. The method of milling a concave surface along one edge of a work piece, which comprises revolving an annular series of cutting edges defining an end cutting face, and relatively feeding the work piece and said edges longitudinally of one edge of said work piece and at a small angle to said face while the work piece is positioned for entry of each edge on one side surface of the work piece and for emergence of the edge from the edge surface of the piece.

14. The method of removing metal to form an elongated concave surface along one edge of a work piece, which comprises revolving an annular series of cutting edges arranged to define an end cutting face, relatively feeding the revolving edges and the work piece longitudinally of said edge to advance the work piece into said face at an angle such that the projection of said face on a plane perpendicular to the direction of feed defines a shallow ellipse, and during such feeding movement, maintaining the work piece offset from the axis of revolution of said edges with one side portion of said ellipse intersecting the side surface of said work piece and the end portion of the ellipse intersecting the edge surface of the work piece.

15. The method of removing metal to form an elongated transversely concaved surface along one edge of a work piece, which comprises revolving an annular series of cutting edges defining an end cutting face, relatively feeding the revolving edges and the work piece longitudinally of said edge to advance the work piece into said face at an angle whereby the projection of said face on a plane perpendicular to the direction of feed defines a shallow ellipse, and during such feeding movement maintaining the work piece positioned for intersection with said edges over an arc of said ellipse extending from a substantially flat side portion thereof substantially to one end of the ellipse.

16. The method of removing metal to form an elongated concave surface along one edge of a work piece, which comprises revolving an annular series of cutting edges arranged to define a frusto-conical end cutting face and a generally semi-circular outer peripheral face, relatively feeding the revolving edges and the work piece to advance the latter into said face at an angle such that the projection of said conical face on a plane perpendicular to the direction of feed defines a shallow ellipse, and during such feeding movement maintaining the work piece positioned for intersection with one end portion of said ellipse.

17. The method of removing metal to form an elongated concave surface along one edge of a work piece, which comprises revolving an annular series of cutting edges arranged to define an end cutting face, relatively feeding the revolving edges and the work piece to advance the latter into said face at an angle such that the projection of said cutting face on a plane perpendicular to the direction of feed defines a shallow ellipse, and during such feeding movement maintaining the work piece positioned for intersection with one end portion of said ellipse.

18. A machine for removing metal to form a groove in a work piece having, in combination, a cutter having a series of cutting edges annularly spaced around one end of the cutter body and defining a frusto-conical end cutting face, each of said edges having an extension at its outer end curving outwardly and away from said face and then reversely on the back of said body, a support for said work piece, and mechanism for relatively feeding the work piece and said cutter longitudinally of the work piece and at a small angle to the plane of rotation of the cutter to relatively advance the work piece toward said end face and through the path traversed by said edges and the extensions thereof whereby to mill a groove in the work piece corresponding in cross-sectional shape to the end of an ellipse.

19. A machine for removing metal from a work piece to form a groove therein having, in combination, a cutter, a series of cutting edges annularly spaced around one end of the cutter body and defining an end cutting face, each of said edges having one extension at its outer end curving outwardly and away from said face and a second extension curved reversely and around the periphery of said body, a support for said work piece, and mechanism for relatively feeding the work piece and said cutter longitudinally of the work piece and at a small angle to the plane of rotation of the cutter to relatively advance the work piece through an arcuate zone of the path traversed by said edges and the extensions thereof.

20. A machine for milling a metal work piece having, in combination, a cutter having a series of radially extending cutting edges annularly spaced around one end of the cutter body and defining an end cutting face, the outer end portion of each edge curving outwardly and away from the central portion of the face, a support for said work piece, mechanism for relatively feeding the work piece and said cutter longitudinally of one edge of the work piece and at a small angle to said face, and means for maintaining said work piece positioned for entry of each edge on one side surface of the work piece and emergence of the curved portion of the edge from the edge surface of the work piece.

21. A machine for scarfing a metal plate having, in combination, a cutter having a series of cutting edges annularly spaced around one end of the cutter body and each having a flat radially extending portion and an outer peripheral portion sloping outwardly and away from the flat portion, said edges defining an end cutting face, a support for said plate, mechanism for relatively feeding the plate and said cutter longitudinally of one edge of the plate and at a small angle to said face, and means for maintaining said plate positioned for entry of each edge on one side surface of the work piece and emergence of said outer end portion of the edge from the edge surface of the plate whereby to generate on the work piece a concave surface which is only slightly curved adjacent said side surface and more sharply curved adjacent the edge surface.

22. A machine for milling a concave surface along one edge of a work piece comprising, in combination, a power rotated cutter on the tool support having an annular series of cutting edges defining an end face disposed at a small angle to the path of said feeding movement, mechanism for relatively feeding said supports along said path in a direction to advance the work piece on said work support against an arcuate portion of said end face offset from the cutter axis, and means operable during such feeding to maintain the work piece in position for entry of each edge on one side surface of the piece and for emergence of the edge from the edge surface of the piece.

23. A machine for removing metal from a work piece comprising, in combination, a power rotated cutter head, a series of radially extending cutting edges annularly spaced around an end face of said head and having a radial width greater than the work surface to be formed, the major portions of said edges lying in a plane disposed perpendicular to the rotational axis of said head and the outer end portions of the edges sloping away from said plane, means supporting said work piece and said head for bodily feeding movement relative to each other along a path intersecting an arcuate portion of said cutter face at an angle of a few degrees, and power actuated mechanism for effecting continuous relative feeding movements along said path.

24. A machine for removing a layer of metal from a work piece comprising, in combination, work and tool supports mounted for relative feeding movement along a predetermined path, a power rotated cutter on said tool support having an annular series of radially extending cutting edges defining a generally flat end cutting face having a radial width greater than the width of the finished work surface and disposed at a small included angle relative to the rough work surface during operation of the cutter on said work piece, the outer end portions of said edges convexly curving away from said end face, and power actuated mechanism for relatively feeding said supports toward and past each other along said path to advance said layer of metal through the path traversed by said edges.

25. A machine for removing a layer of metal from a work piece comprising, in combination, work and tool supports mounted for relative feeding movement along a predetermined path, a power rotated cutter on said tool support having an end face disposed at an included angle of less than ten degrees relative to said path and the rough surface of the work piece whereby the projection of said end face on a plane perpendicular to said path defines a shallow ellipse, and power actuated mechanism for relatively feeding said supports toward and past each other along said path to relatively advance said layer of metal through a zone of said ellipse offset from the cutter axis.

26. A machine for removing metal from a work piece comprising, in combination, a power rotated cutter head, a series of radially extending cutting edges annularly spaced around an end face of said head and having outer ends curved away from the plane of said end face, means supporting said work piece and said head for bodily feeding movement relative to each other at a small included angle between said face and the rough work surface with the work piece positioned for intersection with the path traversed by said edges, and power actuated mechanism for effecting continuous relative feeding movements to advance the work piece past said cutting face.

27. A machine for removing metal from a work piece comprising, in combination, a power rotated cutter head, a series of radially extending cutting edges annularly spaced around an end face of said head and having a radial width greater than the work surface to be formed, said edges lying in a plane disposed substantially perpendicular to the rotational axis of said head, means supporting said work piece and said head for bodily feeding movement relative to each other along a path disposed at an angle of a few degrees to said cutting face, and power actuated mechanism for effecting continuous relative feeding movements along said path to advance a portion of the work piece through an arcuate portion of the zone traversed by said edges.

28. A machine for removing a layer of metal from a work piece to form a generally flat final surface comprising, in combination, non-rotatable work and tool supports mounted for relative rectilinear feeding movement along a predetermined path, a power rotated cutter on said tool support having an end face positioned for engagement at one side with a work piece on said work support, the rotational axis of said cutter being tilted to produce a small included angle between said end face and the rough work surface so that the projection of said cutting face on a plane perpendicular to the direction of feed is a shallow ellipse, and power actuated mechanism for relatively feeding said supports toward and past each other along said path to advance said layer through the path traversed by said edges to generate on the work a surface complemental in contour to an arc of said ellipse.

29. A machine for removing a layer of metal from a work piece comprising, in combination, non-rotatable work and tool supports mounted for relative feeding movement, a power rotated cutter on said tool support having an end cutting face disposed at a small included angle relative to the rough work surface during operation of the cutter on the work whereby the projection of said end face on a plane perpendicular to said direction of feed defines a shallow ellipse, and power actuated mechanism for relatively feeding said supports toward and past each other to advance said layer of metal through a zone of said ellipse offset from the cutter axis whereby to generate on the work piece a final surface having a contour complemental to an arc of said ellipse.

30. A machine for removing metal from a work piece comprising, in combination, work and tool supports mounted for relative feeding movement along a predetermined path, a power rotated cutter on said tool support having a series of radially extending cutting edges annularly spaced around one end thereof and defining an end cutting face inclined at a small angle relative to the direction of said feeding movement, and means supporting the work piece on said work support for engagement of the work by said edges between points of entry and emergence spaced longitudinally of the direction of feeding movement and respectively disposed on the finished and unfinished work surfaces on opposite sides of the axis of rotation of said cutter.

31. A machine for removing metal from a work piece comprising, in combination, work and tool supports mounted for relative feeding movement along a predetermined path, a power rotated cutter on said tool support having a series of radially extending cutting edges annularly spaced around one end thereof, and means supporting the work piece on said work support offset from the cutter axis for engagement by each of said edges as the latter traverse an arcuate path extending generally longitudinally of said path of feed but transversely thereof in opposite directions between points of engagement and disengagement disposed along the path of feed on opposite sides of the cutter axis.

CHARLES E. KRAUS.